United States Patent
Suplin et al.

(10) Patent No.: US 11,834,066 B2
(45) Date of Patent: Dec. 5, 2023

(54) VEHICLE CONTROL USING NEURAL NETWORK CONTROLLER IN COMBINATION WITH MODEL-BASED CONTROLLER

(71) Applicant: GM GLOBAL TECHNOLOGY OPERATIONS LLC, Detroit, MI (US)

(72) Inventors: Vladimir Suplin, Modiin (IL); Avshalom Suissa, Ganei (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 368 days.

(21) Appl. No.: 17/136,411

(22) Filed: Dec. 29, 2020

(65) Prior Publication Data

US 2022/0204018 A1 Jun. 30, 2022

(51) Int. Cl.
*B60W 60/00* (2020.01)
*B60W 10/20* (2006.01)
*G06N 3/08* (2023.01)
*B60W 50/00* (2006.01)

(52) U.S. Cl.
CPC .......... *B60W 60/001* (2020.02); *B60W 10/20* (2013.01); *G06N 3/08* (2013.01); *B60W 2050/0075* (2013.01)

(58) Field of Classification Search
CPC ............ B60W 60/001; B60W 10/20; B60W 2050/0075; G06N 3/08
See application file for complete search history.

(56) References Cited

U.S. PATENT DOCUMENTS 10,829,149 B1* 11/2020 Garimella .............. B62D 6/003
11,458,972 B2* 10/2022 Kim ................ B60W 30/18009
2016/0328644 A1* 11/2016 Lin ........................... G06N 3/08
2018/0120843 A1* 5/2018 Berntorp .............. G05D 1/0088
2021/0078603 A1* 3/2021 Nakhaei Sarvedani .....................
B60W 60/0027

(Continued)

FOREIGN PATENT DOCUMENTS

CN 107065567 A * 8/2017 .......... G05B 13/042
CN 110069993 A * 7/2019 ............... G06K 9/00

OTHER PUBLICATIONS

E. Yurtsever, "Integrating Deep Reinforcement Learning with Model-based Path Planners for Automated Driving", Oct. 2020 ( Year: 2020).*

(Continued)

*Primary Examiner* — Elaine Gort
*Assistant Examiner* — Brittany Renee Peko
(74) *Attorney, Agent, or Firm* — CANTOR COLBURN LLP

(57) ABSTRACT

A vehicle control system for automated driver-assistance includes a model-based controller that generates a first control signal to alter an operation of a plurality of actuators of a vehicle based on a reference trajectory for the vehicle, and a present state of the vehicle and actuators. The vehicle control system further includes a neural network controller that generates a second control signal to alter the operation of the actuators of the vehicle based on a reference trajectory for the vehicle, and the present state of the vehicle and actuators. The vehicle control system further includes a combination module that combines the first control signal and the second control signal to operate the actuators based on a combined signal.

20 Claims, 5 Drawing Sheets

(56) References Cited

U.S. PATENT DOCUMENTS

2021/0263527 A1\*  8/2021  Yazhemsky .......... G05D 1/0221
2022/0055663 A1\*  2/2022  Buehler ............ B60W 60/0027
2022/0097690 A1\*  3/2022  Dede .................... B60W 30/09

OTHER PUBLICATIONS

B. Aichernig, "Learning a Behavior Model of Hybrid Systems Through Combining Model-Based Testing and Machine Learning", 2019 (Year: 2019).\*

Drews, P., Williams, G., Goldfain, B., Theodorou, E.A. & Rehg, J.M.. (2017). Aggressive Deep Driving: Combining Convolutional Neural Networks and Model Predictive Control. Proceedings of the 1st Annual Conference on Robot Learning, in Proceedings of Machine Learning Research (Year: 2017).\*

\* cited by examiner

VEHICLE CONTROL USING NEURAL NETWORK CONTROLLER IN COMBINATION WITH MODEL-BASED CONTROLLER

INTRODUCTION

The subject disclosure relates to automated control of automobiles, and particularly to using neural networks for such automated control in combination with a state-observer based controller.

Modern vehicles typically incorporate a wide variety of sensors and controllers, many of which (such as brake pedal vehicle control system actuators and accelerator pedal actuators) may be implemented as electronic "fly-by-wire" systems rather than mechanically controlled systems. These assemblies are monitored continuously by a controller to facilitate vehicle control.

It is desirable to provide improved vehicle control that improves vehicle trajectory tracking by combining traditional control with neural networks.

SUMMARY

In one exemplary embodiment a vehicle control system for automated driver-assistance includes a model-based controller that generates a first control signal to alter an operation of a plurality of actuators of a vehicle based on a reference trajectory for the vehicle, and a present state of the vehicle and actuators. The vehicle control system further includes a neural network controller that generates a second control signal to alter the operation of the actuators of the vehicle based on a reference trajectory for the vehicle, and the present state of the vehicle and actuators. The vehicle control system further includes a combination module that combines the first control signal and the second control signal to operate the actuators based on a combined signal.

In one or more embodiments, the first control signal is generated based on one or more measurements from a set of sensors associated with the vehicle and actuators.

In one or more embodiments, the neural network controller is pre-trained to generate the second control signal using one or more tuning parameters.

In one or more embodiments, the model-based controller can be adjusted by changing one or more tuning parameters. The tuning parameters can be read by the neural network controller as additional observations.

In one or more embodiments, the actuators of the vehicle operate at least one of a steering, a powertrain, and a brake of the vehicle.

In one or more embodiments, the neural network controller generates the second control signal further based on a predicted state that is output by the model-based controller.

In another exemplary embodiment a computer-implemented method for automated driver-assistance by a vehicle control system includes generating, by a model-based controller, a first control signal to alter an operation of a plurality of actuators of a vehicle based on a reference trajectory for the vehicle, and a present state of the vehicle and actuators. The method further includes generating, by a neural network controller, a second control signal to alter the operation of the actuators of the vehicle based on a reference trajectory for the vehicle, and the present state of the vehicle and actuators. The method further includes combining, by a combination module the first control signal and the second control signal to operate the actuators based on a combined signal.

In yet another exemplary embodiment a vehicle includes multiple actuators for controlling operations of the vehicle. The vehicle further includes a vehicle control system for automated driver-assistance, the vehicle control system being dynamically tuned to control the operations of the vehicle. The vehicle control system includes a model-based controller that generates a first control signal to alter an operation of a set of actuators of a vehicle based on a reference trajectory for the vehicle, and a present state of the vehicle and actuators. The vehicle control system further includes a neural network controller that generates a second control signal to alter the operation of the set of actuators of the vehicle based on a reference trajectory for the vehicle, and the present state of the actuators. The vehicle control system further includes a combination module that combines the first control signal and the second control signal to operate the actuators based on a combined signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
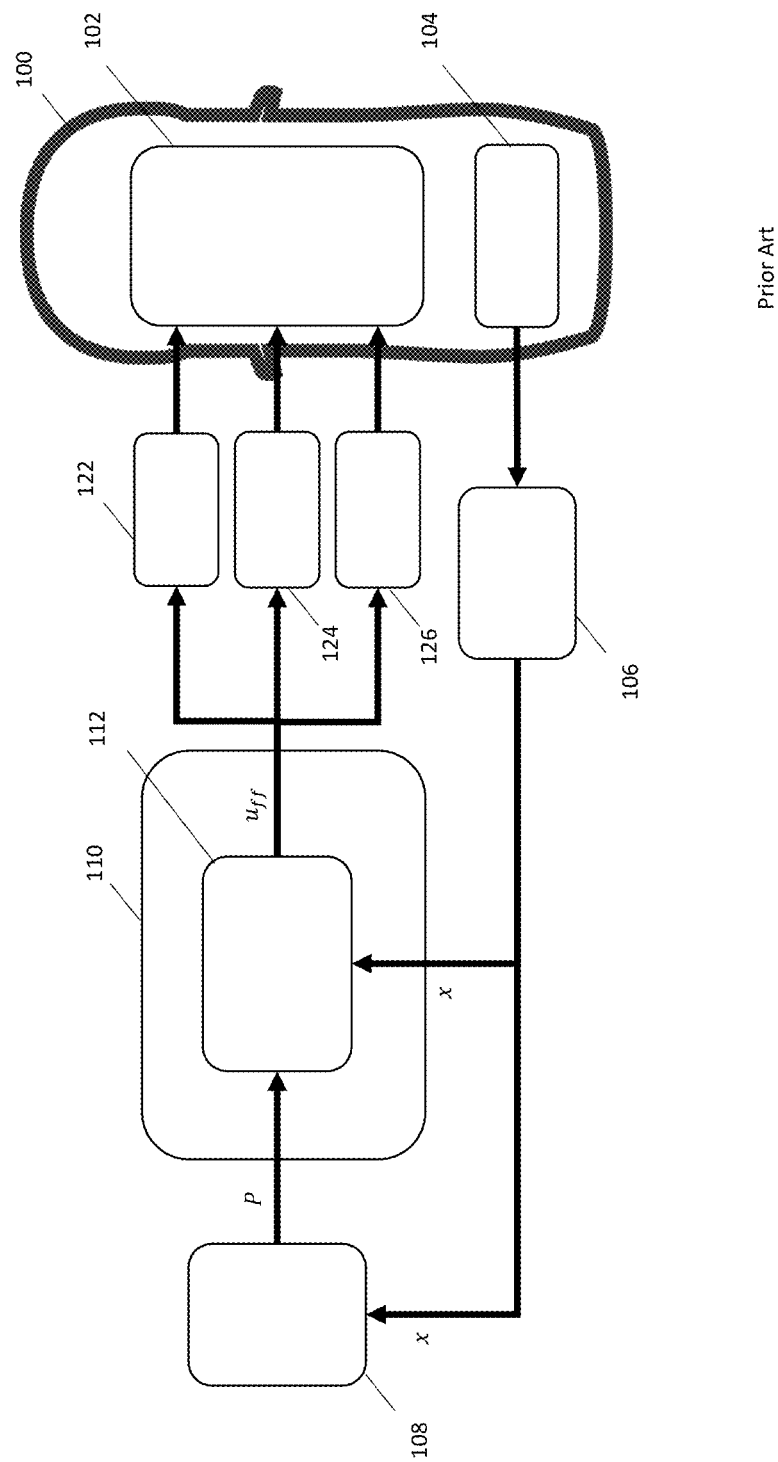
FIG. 1 is a block diagram of a typical vehicle control system.

The following description is merely exemplary in nature and is not intended to limit the present disclosure, its application or uses. It should be understood that throughout the drawings, corresponding reference numerals indicate like or corresponding parts and features. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment a method is described for vehicle control that improves vehicle trajectory tracking by combining signals from a trajectory controller of a vehicle with a neural network controller to control operations/trajectory of the vehicle. Technical challenges with existing trajectory controllers include a sensitivity to unmodeled vehicle dynamics, and variation, or uncertainties, regarding parameters and non-linearities that are modeled. Embodiments described herein address such technical challenges by using neural network controllers in combination with the trajectory controllers.

However, using neural network controllers in vehicles have technical challenges. For example, neural network controllers lack on-line tuning, and training neural network controllers requires numerous samples, and further, such training is undesirable during operation of the vehicle in real world.

Embodiments described herein address such technical challenges with the neural network controllers as well. By combining the traditional trajectory controller and the neural network controller, embodiments described herein facilitate taking advantage of model-based approach of the trajectory controllers, such as on-line tuning, and the data driven approach of the neural network controllers, such as superior non-linear control. Accordingly, such combination resolves the drawbacks of both approaches.

Referring now to FIG. 1, a block diagram of a typical vehicle control system is depicted. A vehicle 100 includes a module for controlling one or more vehicle actuators 102. The vehicle actuators 102 physically change the operation of the vehicle 100. The vehicle actuators 102 can cause a change in the operation of steering 122, powertrain 124, brakes 126, among other components of the vehicle 100. The vehicle actuators 102 change the operations of such components based on control signals ($u_{ff}$) from the vehicle controller 110, and particularly a trajectory controller 112 that is part of the vehicle controller 110. The trajectory controller 112 generates the control signals ($u_{ff}$) based on one or more estimated states (x) of the vehicle 100. The control signals ($u_{ff}$) can include commands such as turn the steering by Y degrees, push the brake pedal Y %, or any other such command that physically alters the operation of the vehicle 100.

The states (x) of the vehicle 100 are estimated by a state estimator 106 based on measurements from one or more sensors 104 associated with the vehicle 100. The state estimator 106 can use known techniques for state estimation, such as Kalman filtering, or any other techniques. The states (x) of the vehicle 100 can include position of fuel throttle, position of brake pedal, position of steering, and other such operational states of the vehicle 100. The sensors 104 measure physical quantities and generate a considerate output, in the form of electrical signals that can provide measurements that facilitate estimating such states (x) of the vehicle 100. For example, the sensors 104 can provide measurements such as, velocity, acceleration, angular velocity, and other such physical quantities associated with the vehicle actuators 102 and/or other components of the vehicle 100.

The estimated states (x) of the vehicle 100 are provided to a path planning module 108. The path planning module 108, which can be part of an advanced driver-assistance system (not shown) determines a path (P) to be taken by the vehicle 100 as part of an overall route planning/navigation operation, or vehicle control operation. The path planning module 108 generates the path (P) using techniques that are known, or will be known, and its operation does not affect the operation of the features of the technical solutions described herein.

The trajectory controller 112 receives the path (P) and the estimated states (x) of the vehicle 100. The trajectory controller 112 can be a model-based controller, such as a proportional-integral-derivative (PID) controller, a model-predictive controller (MPC), a linear-quadratic-regulator (LQR) based controller, or any other such pre-programmed controller. The trajectory controller 112, using the programmed model, generates the control signals ($u_{ff}$) based on the received inputs, P, and x. As noted earlier, the control signals ($u_{ff}$) alter the state of one or more of the vehicle actuators 102.

The above operations are performed repeatedly causing the vehicle 100 to move autonomously. A technical challenge with this existing setup is that such vehicle control using the model-based trajectory controller 112 suffers from sensitivity to unmodeled vehicle dynamics, variation in parameters, and non-linearities in the inputs and operating factors. Because such factors cannot be anticipated and/or pre-programmed in the model-based controllers, the operation of the vehicle 100 may be unexpected when such factors are encountered when the vehicle 100 is being operated.

Figure 2:
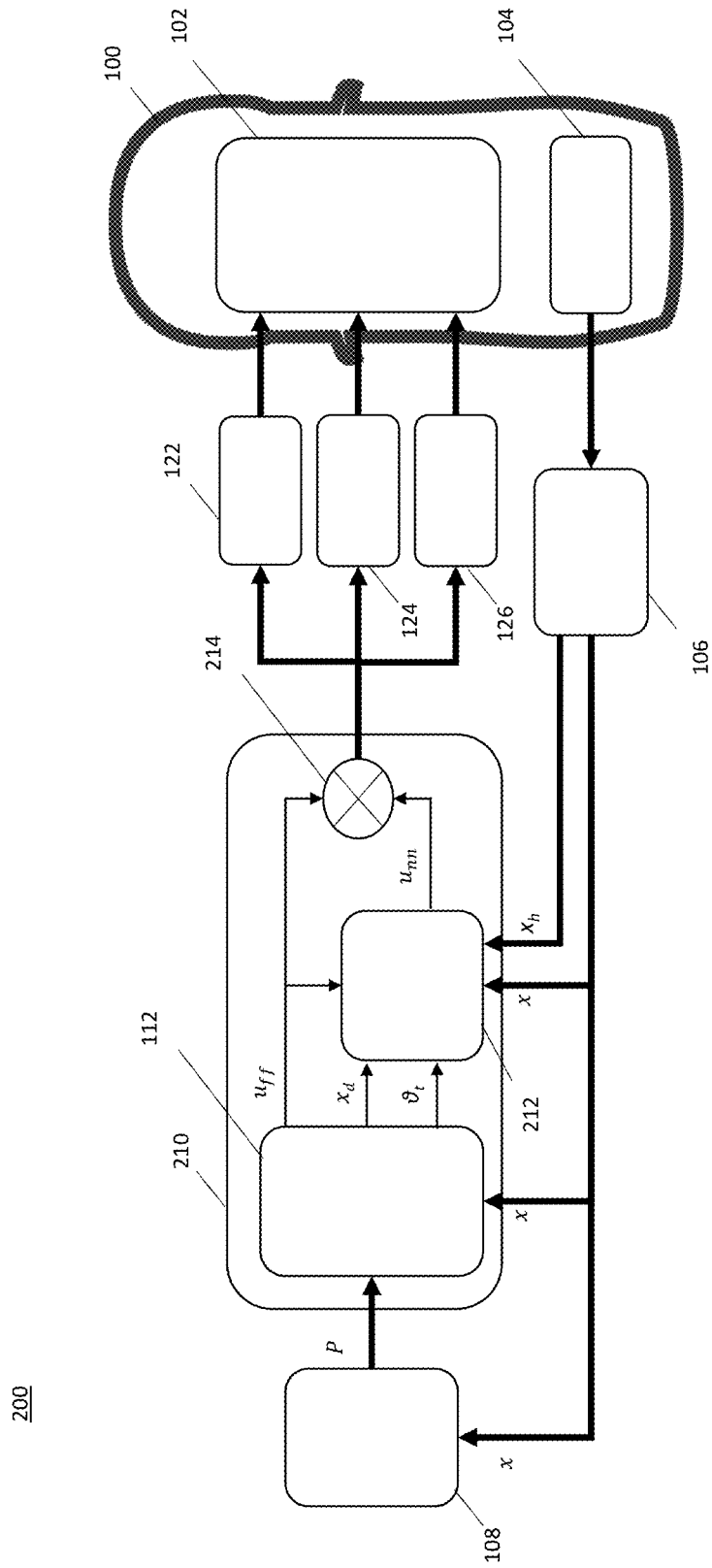
FIG. 2 is a vehicle control system that uses a combination of a model-based controller and a neural network controller according to one or more embodiments.

FIG. 2 depicts a vehicle control system 200 that uses a combination of a model-based controller and a neural network controller according to one or more embodiments. According to one or more embodiments, in the vehicle control system 200, the controller 210 includes a neural network controller 212 in addition to the trajectory controller 112. A neural network controller 212 includes one or more processors that implement an artificial neural network (ANN), such as a recurrent neural network (RNN), a convolutional neural network (CNN), a deep neural network (DNN), or any other type of ANN or a combination thereof. In one or more examples, the neural network implements a fully connected ANN.

The neural network controller 212 receives, as input, the estimated states (x) from the state estimator 106, and the control signals ($u_{ff}$) from the trajectory controller 112. In addition, the neural network controller 212 receives additional estimated states ($x_h$) from the state estimator 106, and input states ($x_d$) from the trajectory controller 112. The estimated states $x_b$ and $x_d$ are in addition to the estimated states x that the trajectory controller 112 uses to generate the control signals $u_{ff}$. The neural network controller 212 can use a different set of observations than the trajectory controller 112. For example, sensors 104 such as, cameras, can be used by the neural network controller 212, which are challenging for the trajectory controller 112. Hence, the states $x_b$ can be different from the states x used by the trajectory controller 112.

Additionally, the trajectory controller 112 can provide reference trajectory states $x_d$ that are generated by an internal model of the trajectory controller 112. The neural network controller 212 can use such states $x_d$ to modify behavior of the vehicle 100 to mimic the internal model, in one or more embodiments.

Further, the neural network controller 212 receives tuning parameters ($\theta_t$), for example, hyperparameters, from the trajectory controller 112. Based on the input states (x, $x_b$, $x_d$), the tuning parameters ($\theta_t$), and one or more weights that are a result of a training phase, the neural network controller 212 generates a second set of control signals ($u_{nn}$).

The first set of control signals ($u_{ff}$) from the trajectory controller 112 and the second set of control signals ($u_{nn}$) from the neural network controller 212 are combined (214) and sent to the various modules including the steering 122, powertrain 124, and brakes 126. Such combined control signals are used to control the vehicle actuators 102, which in turn change the states (x, $x_b$, $x_d$). This process is performed continuously. A combination module 214 combines the control signals by performing addition, subtraction, or weighted sum (or difference) of the control signals.

The neural network controller 212 is pre-trained in an offline manner. In addition, during the real-time operation of the vehicle control system 200, the one or more operating parameters of the neural network controller 212 are further adjusted based on various inputs that are encountered. The operating parameters that are adjusted in real-time can include the tuning parameters ($\theta_t$).

The neural network controller 212 can be programmed with an initial training cost function. In one or more examples, the cost function can be based on the reference trajectory states ($x_d$). Accordingly, at a later time, tuning the trajectory controller 112, can also alter the output control signals ($u_{nn}$) of the neural network controller 212. In addition, the cost function can be selected so that discrepancy between using the trajectory controller 112 alone versus using the combination of the trajectory controller 112 and the neural network controller 212 can be limited (e.g. by penalizing the neural network controller output over a predetermined threshold). In addition, the cost function can facilitate prohibiting specific operational regions of the vehicle 100 from being affected by the neural network controller by increasing operational penalties for those specific regions. Here, "regions" represent operational regions (modes) of the vehicle 100. For example, if the neural network controller 212 is not to be operated above a particular speed, or any other such threshold condition, an operational penalty value can be configured on the output of the neural network controller 212, when the vehicle 100 reaches the threshold condition, such as the particular speed, during the training process An example cost function is:

$$\text{Cost} = \sum_{k=0}^{N} \gamma^k [w_1(y_p(k) - y(k))^2 + w_2(x_d(k) - x(k))^2 + w_3(x(k))(u_{ff}(k) - u_{nn}(k))^2]$$

Here, N is the optimization horizon length, $w_i$ represents a weight value of various performance components of the neural network controller 212, y and $y_p$ are desired and actual vehicle trajectory, x and $x_d$ are desired and actual vehicle states and $u_{ff}$-$u_{nn}$ is the difference between the output of the network controller 212 and the model based controller 112. It should be noted that although three weights w1, w2, and w3, are shown in the above equation, in other examples, a different number of weights can be used in other embodiments.

Figure 3:
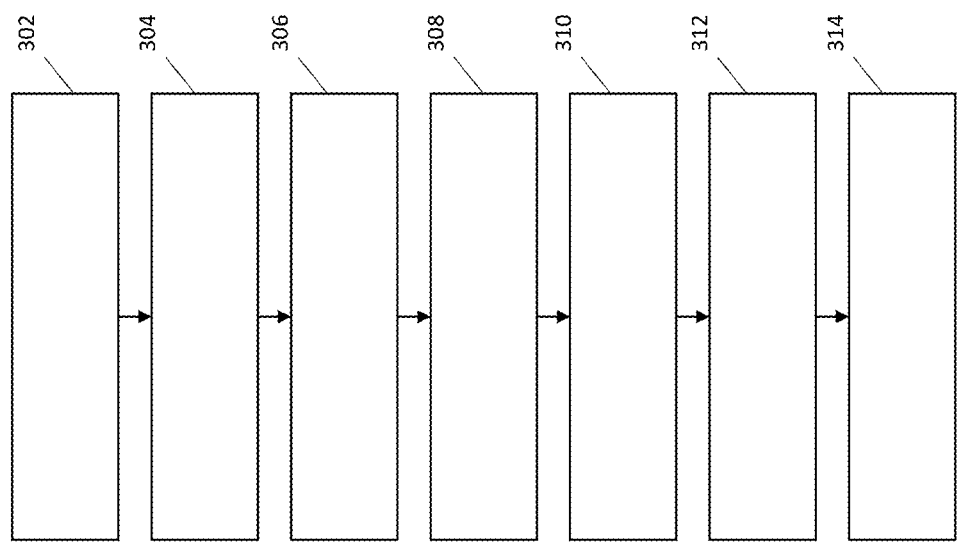
FIG. 3 is a flowchart of a method for using a combination of a model-based controller and a neural network controller for autonomously performing one or more operations of a vehicle according to one or more embodiments.
Figure 4:
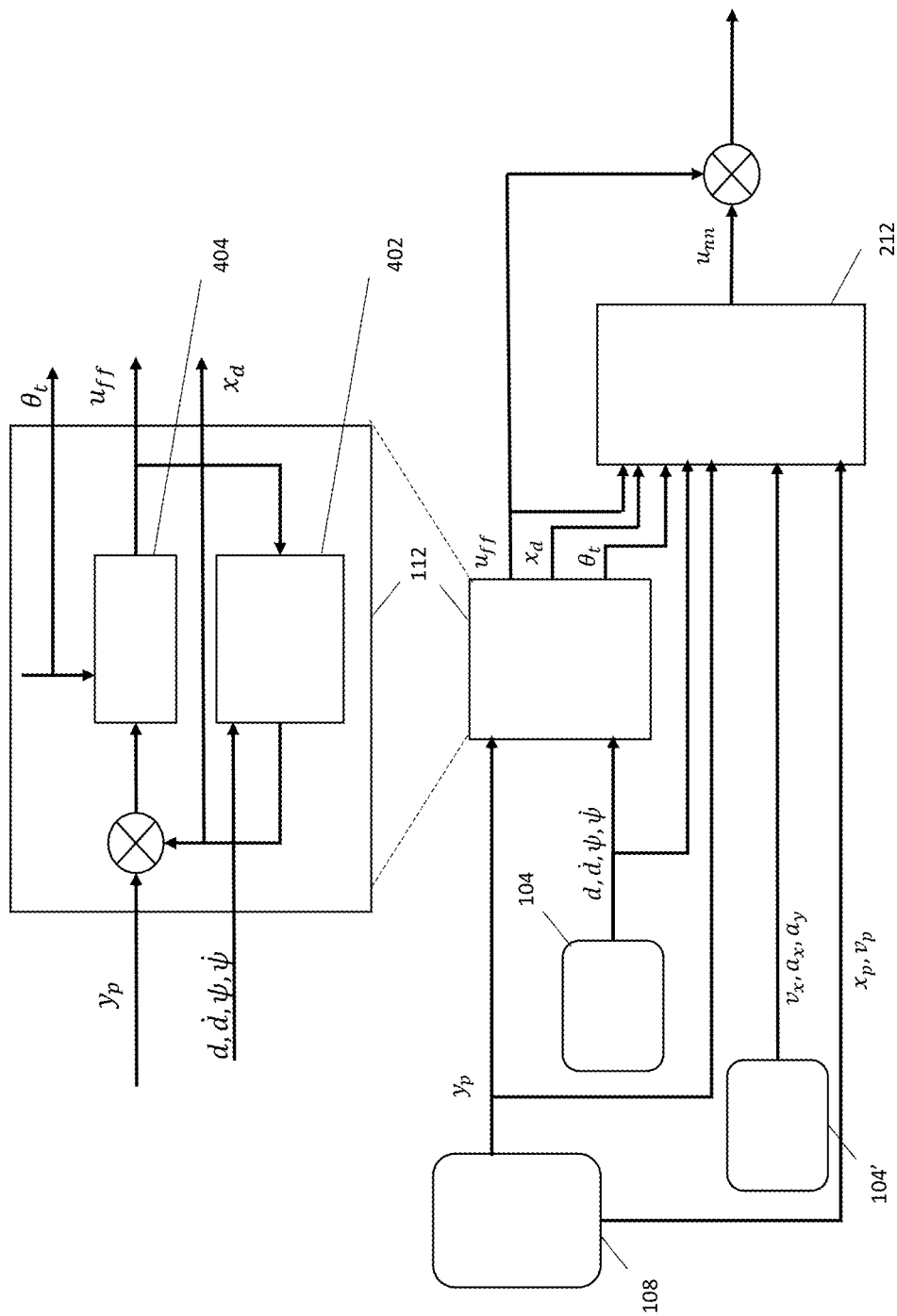
FIG. 4. is a block diagram of a vehicle control system according to one or more embodiments.

FIG. 3 depicts a flowchart of a method for using a combination of a model-based controller and a neural network controller for autonomously performing one or more operations of a vehicle according to one or more embodiments. The method 300 that is depicted is described in conjunction with a block diagram of FIG. 4 that depicts the vehicle control system 200 according to one or more embodiments.

The method 300 includes generating first control signals by the trajectory controller 112 based on a vehicle model 402 of the vehicle 100, at block 302. The trajectory controller 112 receives measurements from the sensors 104, and/or the estimated states (x) based on such measurements. For example, the sensor measurements can include displacement (d) of the vehicle 100 from a reference trajectory ($y_p$) that is received from the path planner 108, and a velocity of such displacement (d). The measurements can further include yaw angle difference ($\psi$) of the vehicle from a reference in the trajectory $y_p$, and a yaw angular velocity ($\dot{\psi}$) of the vehicle 100. The first control signals ($u_{ff}$) are generated based on the vehicle model 402, to cause the vehicle actuators 102 to change the operation of the vehicle 100 so that the measurements match the reference trajectory $y_p$.

In addition, the trajectory controller 112 outputs a predicted state ($x_d$) of the vehicle 100 based on the vehicle model 402, at block 304. The predicted state ($x_d$) is input to the neural network controller 212. The predicted state ($x_d$) represents an estimated state of the operation of the vehicle 100 upon applying the first control signals ($u_{ff}$).

Further, the trajectory controller 112 computes the cost function (e.g., see equation above) based on previous output of the neural network controller 212 and the output of the trajectory controller 112, at block 306.

The method 300 further includes using the neural network controller 212 to generate second control signals ($u_{nn}$) based on several inputs (x, $x_h$, $x_d$), at block 308. The neural network controller 212 generates the second control signals ($u_{nn}$) based on one or more weight values assigned. The weight values can be initially assigned using an offline training. The training can be performed using one or more known neural network training techniques, such as supervised training, and any other known or to be known training technique. In one or more examples, the neural network controller 212 is trained using reinforcement learning algorithms such as Deep Deterministic Policy Gradient (DDPG), Proximal Policy Optimization (PPO), Soft Actor-Critic (SAC), or any other such algorithms.

The training is performed using the control system 200 that includes a combination of the neural network controller 212 with the trajectory controller 112. This way, the neural network controller 212 is trained using observation signals from the trajectory controller 112 along with the sensor measurements and estimated states that are based on the measurements. The training is performed to provide exploration using a stochastic policy in one or more examples. Further, various combinations of tuning parameters ($\theta_t$) are used during the training to determine an optimal set of tuning parameters for the neural network controller 212 operating in the combination.

The method 300 further includes combining the first control signals ($u_{ff}$) and the second control signals ($u_{nn}$) to generate third control signals, at block 310. The combining can include addition (or subtraction) of the first control signals ($u_{ff}$) and the second control signals ($u_{nn}$). Alternatively, in other embodiments, the combination can be a weighted sum (or difference) of the first control signals ($u_{ff}$) and the second control signals ($u_{nn}$). Any other combination of the first control signals ($u_{ff}$) and the second control signals ($u_{nn}$) is possible in other embodiments. The third control signals are sent to the vehicle actuators 102 to change the operation of the vehicle 100, at block 312.

Further, the control system 200 is re-tuned by adjusting one or more parameters of the trajectory controller 112, at block 314. The re-tuning is based on the cost function computed by an optimizer module 404 of the trajectory controller 112. The neural network controller 212 receives the value of the cost function, which represents a difference between the reference trajectory ($y_p$) and the output of the trajectory controller 112, along with the estimated states (x, $x_h$, $x_d$). In one or more embodiments, in addition to the inputs received by the trajectory controller 112, the neural network controller 212 can use additional measurements such as longitudinal velocity ($v_x$), longitudinal acceleration ($a_x$), lateral acceleration ($a_y$), among others. In one or more embodiments, such measurements can be used to generate the estimated states $x_h$.

Accordingly, the neural network controller 212 can be re-trained in real-time during operation of the vehicle 100 to improve the operation of the vehicle control system 200.

The vehicle control system 200, by using the model-based trajectory controller 112 in combination with a neural network controller 212, provides a stable and safe learning environment for the neural network controller 212. The vehicle control system 200 facilitates to train the neural network controller 212 using data that is encountered during the operation of the vehicle 100 in a safe manner. Training the neural network controller 212 requires lesser samples compared to those required without a combination with the model-based trajectory controller 112.

In one or more embodiments, after the neural network controller 212 has been trained the trajectory controller 112 can be used to tune the neural network controller 212 by changing one or more parameters of the neural network controller 212 without additional training.

Various experimental scenarios have shown that a vehicle control system using a combination of a model-based trajectory controller and a neural network controller, as described herein, improve vehicle operations such as, by improving lateral deviation and steering control during automated driving assistance. Such improvements have been seen in various types of road-courses, such as city/urban roads, as well as remote/rural roads.

Embodiments of the technical solutions described herein improve vehicle control systems used for autonomously performing one or more operations of a vehicle and provide a practical application to do so. The improvements provided include, but are not limited to, avoiding the need for an accurate dynamic and nonlinear model of the vehicle. Creating and managing such a dynamic and nonlinear model of a system as complex as a vehicle is a technical challenge, and the technical solutions described herein can facilitate performing autonomous operations without such a model. Further, embodiments described herein improve the performance of the vehicle control system compared to existing systems that use a model-based controller alone, where the model, as noted earlier, cannot encompass the complexities of the system. Additionally, embodiments described herein do not require a change in the existing control design of the vehicle control system, because the combination of the neural network controller with the model-based trajectory controller replaces an existing trajectory controller in a modular manner.

Figure 5:
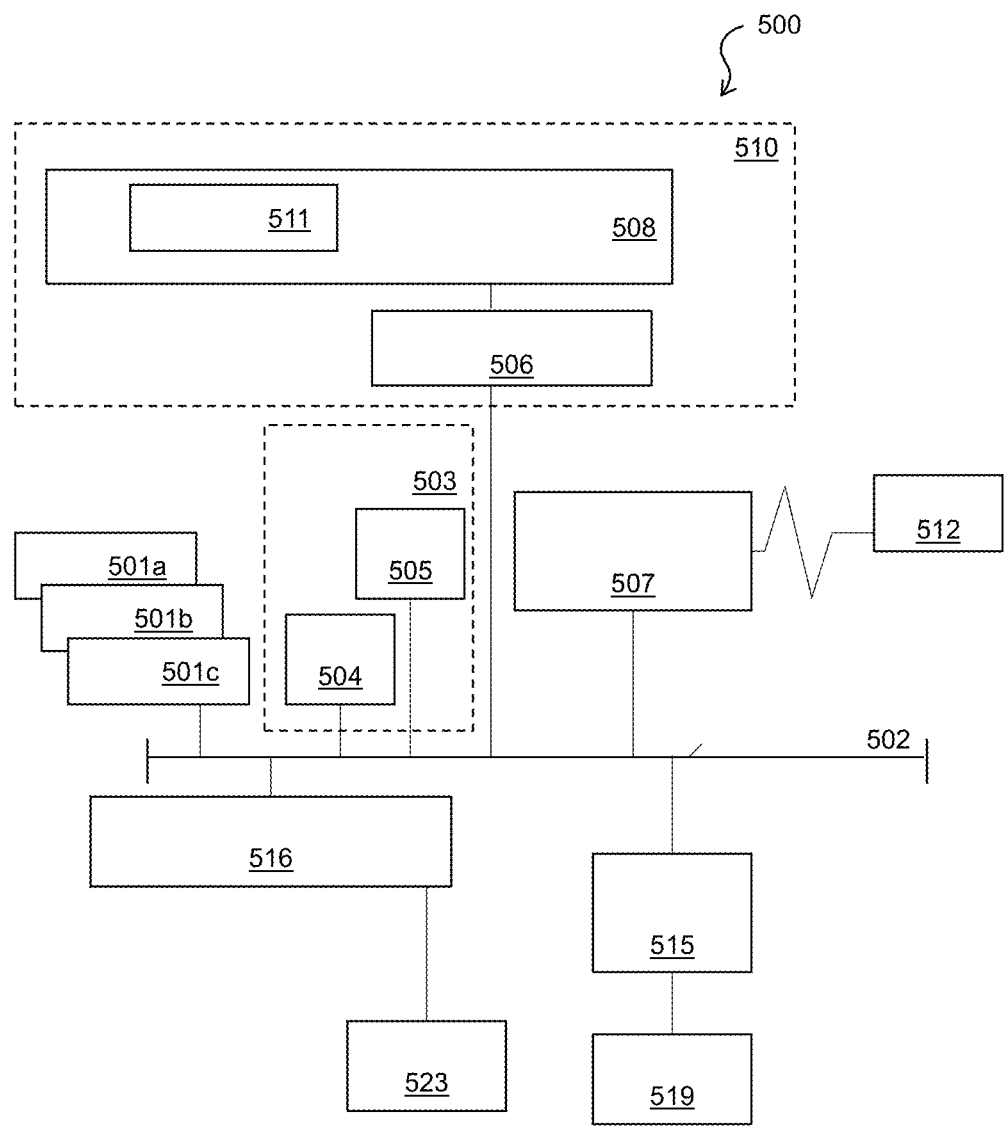
FIG. 5 is a block diagram of a computer system in accordance with an embodiment.

Turning now to FIG. 5, a computer system 500 is generally shown in accordance with an embodiment. The computer system 500 can be used as any of the devices and/or apparatus described herein, such as those equipped in the vehicle 100. In one or more embodiments, the computer system 500 implements one or more methods described herein. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random-access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A speaker 523, input devices such as touchscreens, buttons, and other such human-interactive devices (not shown), etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the human-interactive devices (not shown), and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method or process may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle control system for automated driver-assistance, the vehicle control system comprising:
a model-based controller that generates a first control signal to alter an operation of a plurality of actuators of a vehicle based on a reference trajectory for the vehicle, and a present state of the vehicle and actuators;
a neural network controller that generates a second control signal to alter the operation of the actuators of the vehicle based on a reference trajectory for the vehicle, and the present state of the vehicle and actuators, and wherein the neural network controller is prohibited from affecting specific operational regions of the vehicle via a training cost function configured to increase operational penalties for the specific operational regions during a training process of the neural network controller, and wherein the training cost function is:

$$\text{Cost} = \sum_{k=0}^{N} \gamma^k \left[ w_1(y_p(k) - y(k))^2 + w_2(x_a(k) - x(k))^2 + w_3(x(k))(u_{\!f\!f}(k) - u_{nn}(k))^2 \right]$$

where N is an optimization horizon length, $w_i$ is a weight value of various performance components of the neural network controller, y and $y_p$ are desired and actual vehicle trajectory, x and $x_d$ are desired and actual vehicle states and $u_{\!f\!f} - u_{nn}$ is a difference between the output of the network controller and the model based controller; and
a combination module that combines the first control signal and the second control signal to operate the actuators based on a combined signal.

2. The vehicle control system of claim 1, wherein the first control signal is generated based on one or more measurements from a set of sensors associated with the vehicle and actuators.

3. The vehicle control system of claim 1, wherein the neural network controller is pre-trained to generate the second control signal using one or more tuning parameters.

4. The vehicle control system of claim 1, wherein the model-based controller is adjusted by changing one or more tuning parameters of the model-based controller.

5. The vehicle control system of claim 4, wherein the neural network controller is trained in response to the one or more tuning parameters of the model-based controller being adjusted.

6. The vehicle control system of claim 1, wherein the actuators of the vehicle operate at least one of a steering, a powertrain, and a brake of the vehicle.

7. The vehicle control system of claim 1, wherein the neural network controller generates the second control signal further based on a predicted state that is output by the model-based controller.

8. A computer-implemented method for automated driver-assistance by a vehicle control system, wherein the computer-implemented method comprises:
generating, by a model-based controller, a first control signal to alter an operation of a plurality of actuators of a vehicle based on a reference trajectory for the vehicle, and a present state of the vehicle and actuators;
generating, by a neural network controller, a second control signal to alter the operation of the actuators of the vehicle based on a reference trajectory for the vehicle, and the present state of the vehicle and actuators, and wherein the neural network controller is prohibited from affecting specific operational regions of the vehicle via a training cost function configured to increase operational penalties for the specific operational regions during a training process of the neural network controller, and wherein the training cost function is:

$$Cost = \sum_{k=0}^{N} \gamma^k \left[ w_1(y_p(k) - y(k))^2 + w_2(x_a(k) - x(k))^2 + w_3(x(k))(u_{ff}(k) - u_{nn}(k))^2 \right]$$

where N is an optimization horizon length, $w_i$ is a weight value of various performance components of the neural network controller, y and $y_p$ are desired and actual vehicle trajectory, x and $x_d$ are desired and actual vehicle states and $u_{ff}$–$u_{nn}$ is a difference between the output of the network controller and the model based controller; and combining, by a combination module the first control signal and the second control signal to operate the actuators based on a combined signal.

9. The method of claim 8, wherein the first control signal is generated based on one or more measurements from a set of sensors associated with the vehicle and actuators.

10. The method of claim 8, wherein the neural network controller is pre-trained to generate the second control signal using one or more tuning parameters.

11. The method of claim 8, wherein the model-based controller is adjusted by changing one or more tuning parameters of the model-based controller.

12. The method of claim 11, wherein the neural network controller is trained in response to the one or more tuning parameters of the model-based controller being adjusted.

13. The method of claim 8, wherein the actuators of the vehicle operate at least one of a steering, a powertrain, and a brake of the vehicle.

14. The method of claim 8, wherein the neural network controller generates the second control signal further based on a predicted state that is output by the model-based controller.

15. A vehicle comprising:
a plurality of actuators for controlling operations of the vehicle;
a vehicle control system for automated driver-assistance, the vehicle control system being dynamically tuned to control the operations of the vehicle, wherein the vehicle control system comprises:
a model-based controller that generates a first control signal to alter an operation of a set of actuators of a vehicle based on a reference trajectory for the vehicle, and a present state of the vehicle and actuators;
a neural network controller that generates a second control signal to alter the operation of the set of actuators of the vehicle based on a reference trajectory for the vehicle, and the present state of the actuators, and wherein the neural network controller is prohibited from affecting specific operational regions of the vehicle via a training cost function configured to increase operational penalties for the specific operational regions during a training process of the neural network controller, and wherein the training cost function is:

$$Cost = \sum_{k=0}^{N} \gamma^k \left[ w_1(y_p(k) - y(k))^2 + w_2(x_a(k) - x(k))^2 + w_3(x(k))(u_{ff}(k) - u_{nn}(k))^2 \right]$$

where N is an optimization horizon length, $w_i$ is a weight value of various performance components of the neural network controller, y and $y_p$ are desired and actual vehicle trajectory, x and $x_d$ are desired and actual vehicle states and $u_{ff}$–$u_{nn}$ is a difference between the output of the network controller and the model based controller; and
a combination module that combines the first control signal and the second control signal to operate the actuators based on a combined signal.

16. The vehicle of claim 15, wherein the first control signal is generated based on one or more measurements from a set of sensors associated with the vehicle and actuators.

17. The vehicle of claim 15, wherein the neural network controller is pre-trained to generate the second control signal using one or more tuning parameters, and the model-based controller adjusts one or more tuning parameters of the neural network controller during runtime.

18. The vehicle of claim 17, wherein the model-based controller is adjusted by changing one or more tuning parameters of the model-based controller.

19. The vehicle of claim 15, wherein the actuators of the vehicle operate at least one of a steering, a powertrain, and a brake of the vehicle.

20. The vehicle of claim 15, wherein the neural network controller generates the second control signal further based on a predicted state that is output by the model-based controller.

* * * * *